United States Patent [19]
Eckhoff

[11] Patent Number: 5,882,737
[45] Date of Patent: Mar. 16, 1999

[54] APPARATUS AND METHOD FOR RADIATION PROCESSING OF MATERIALS

[76] Inventor: Paul S. Eckhoff, 506 Rte. 25, Stuyvesant, N.Y. 12173

[21] Appl. No.: 45,197

[22] Filed: Mar. 20, 1998

[51] Int. Cl.⁶ ............................................. C08F 2/46
[52] U.S. Cl. ..................... 427/487; 422/186; 528/502; 528/503
[58] Field of Search .................. 528/502, 503, 528/480; 422/186; 427/487

[56] References Cited

U.S. PATENT DOCUMENTS 3,766,031 10/1973 Dillon .
4,748,005 5/1988 Neuberg et al. .
4,777,192 10/1988 Neuberg et al. .
4,998,486 3/1991 Dighe et al. .

*Primary Examiner*—Terressa Mosley
*Attorney, Agent, or Firm*—Jay R. Yablon

[57] ABSTRACT

A method and apparatus for the continuous feeding of polymer chips or particles to an electron beam accelerator makes use of spreading, belt conveying, irradiation and cooling. The apparatus is designed to make more efficient use of radiation through continuous feed.

22 Claims, 3 Drawing Sheets

APPARATUS AND METHOD FOR RADIATION PROCESSING OF MATERIALS

FIELD OF THE INVENTION

This invention relates to continuous radiation treatment for cross linking and degradation of polymers including but not limited to cross linking of polytetrafluorethylene (PTFE).

BACKGROUND OF THE INVENTION

The purpose of radiation crosslinking for solid polymers is to facilitate air fluidized bed grinding of the subject polymer to a fine powder. Many polymers, including PTFE, can only be ground by using an air jet mill in fluidized bed form. The more uniform the radiation dosage, the faster grinding can proceed. In addition, irradiation is most efficient if the polymer temperature during irradiation can be maintained below a predetermined maximum temperature.

The methods currently in practice to irradiate polymers including but not limited to polytetrafluoroethylene (PTFE), are batch processes, which are slow and result in non-uniform irradiation and cooling. Dillon (U.S. Pat. No. 3,766,031) teaches the use of trays containing chips which make multiple passes under a radiation beam. Multiple passes reduce problems of heat and discoloration of the polymer. But despite the use of multiple passes, this tray method is slow and inefficient, and results in some non-uniform irradiation and cooling.

Neuberg and Luniewski (U.S. Pat. Nos. 4,477,192 and 4,748,005) teach the use of a ribbon blender for irradiation. This is also a batch process employing a single charge of chips placed into a water-jacketed ribbon blender wherein agitation for periods up to eight hours is relied upon for surface exposure to the electron beam. The ribbon blender method is slow and inefficient because of time consumed in loading and unloading the blender. Further, because it is common to process recycled PTFE scrap from numerous sources where the specifications, including density, vary widely, the radiation dosage is non-uniformly applied, particularly where the polymer chips are of differing densities and heavier chips tend to seek the bottom of the blender and resist complete agitation. The ribbon blender method also suffers from only random exposure of chips to the cooling surface of the blender shell, and thus, non-uniform cooling.

In short, the prior art methods are slow, chips are not uniformly radiated, and they are not uniformly cooled.

OBJECTS OF THE INVENTION

It is an object of the present invention to provide an apparatus and method for faster and more uniform production of irradiated chip polymers and faster air grinding.

In particular, it is an object of this invention to enable polymer chips to be uniformly irradiated, while being uniformly cooled to optimum temperature.

It is a further object of this invention to enable polymer irradiation to be performed more rapidly than is enabled by the prior art.

SUMMARY OF THE INVENTION

There is provided an apparatus and method for continuous feeding, radiation, cross linking and processing of polymer chips so that they may be further processed into fine powder. PTFE is one polymer that is suitably processed by this apparatus and method, though the apparatus and method work equally well for any solid polymer for which further cross-linking is desired. In its preferred embodiment, the apparatus includes a chip supply, feed auger, a hopper for holding chips, a rotary spreader, spreader bar for depth control, an endless stainless steel belt conveyor, a cooling means with non-contact coolant sprays under the conveyor, the electron beam accelerator and a chip collection hopper at the end of the conveyor.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
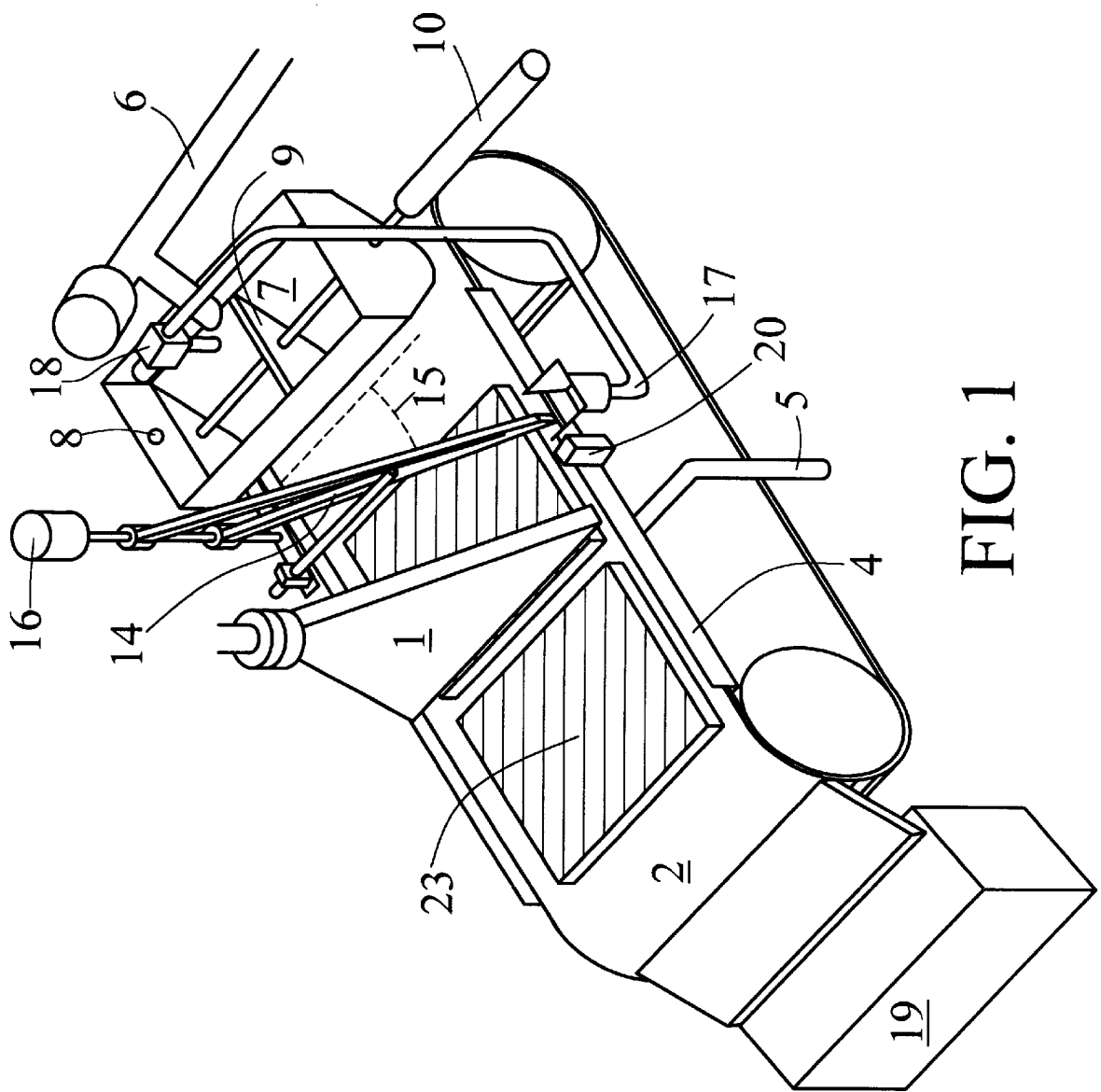
FIG. 1 is a perspective view showing the auger feed, feed hopper, rotary spreader, spreader bar and belt.
Figure 2:
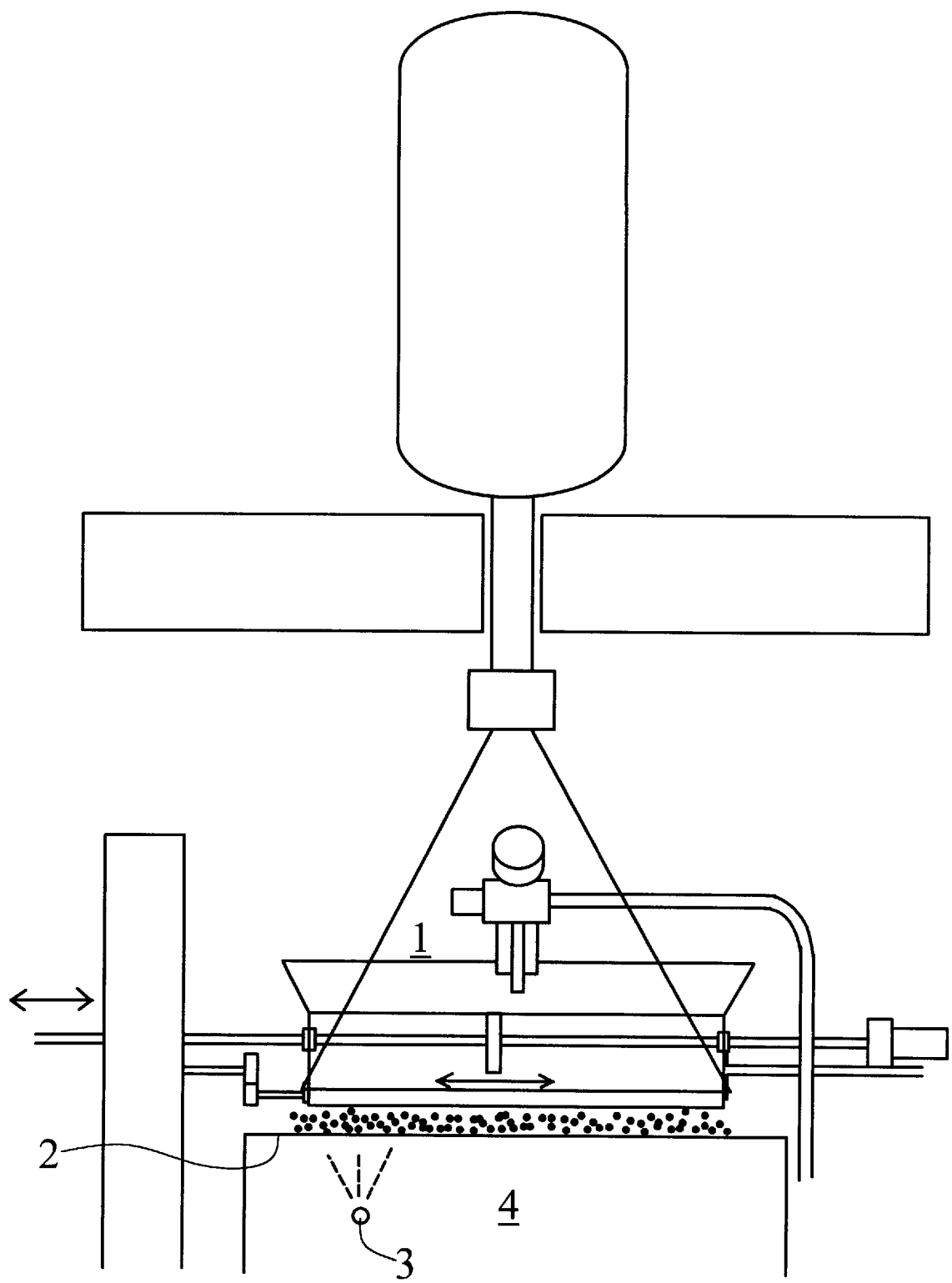
FIG. 2 is an end view of a material processing apparatus in accordance with the present invention.

FIGS. 1 and 2, respectively, are perspective and end views of an apparatus for processing material in accordance with the present invention. The apparatus is useful for radiation cross linking of polymers in order to render a polymer, particularly PTFE, suitable for air grinding into fine powder. In the form of powder PTFE has many uses ranging from frying pans to lubricants.

The apparatus is located within a masonry vault (not shown) to contain ozone and stray radiation, and both the inlet to the system and the outlet are isolated from areas occupied by personnel by means of rotary iron valves (not shown), known commercially as "Rotoloks."

Unradiated chips are fed by auger 6 into chip feed hopper 7, passing over a magnetic separator (not shown) to remove undesired "tramp iron." A hopper level sensor 8 for detecting when the chips have reached a certain level, controls the motor of auger feed 6 so as to prevent overflowing feed hopper 7. This level sensor may be a photocell, or any other suitable device known in the art for the purpose of detecting when a material (such as chips) has accumulated to a certain level. Because chips sometimes bridge and stop flowing, a vibrating commercial air jet (not shown) is added to each side of feed hopper 7 to facilitate flow. In a preferred embodiment, the width of feed hopper 7 is approximately four feet, though it can be any size greater than approximately one foot, limited only by the size of the vault containing the apparatus.

Figure 3:
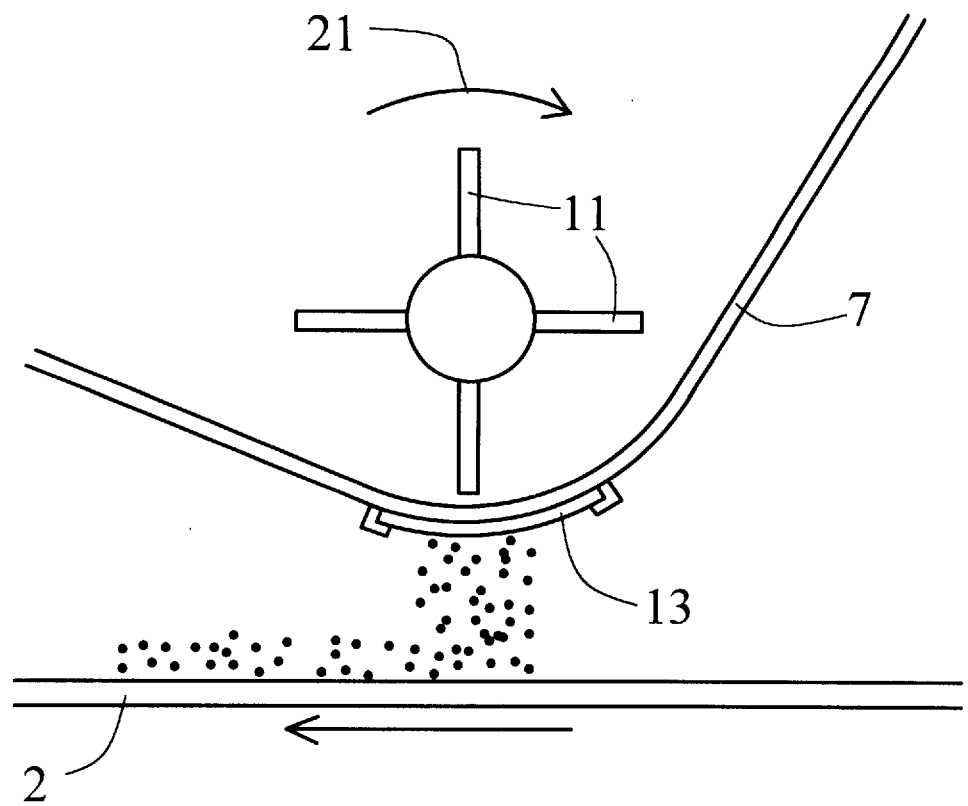
FIG. 3 is a side view of the rotary scraper and spreader slide.

To more evenly distribute incoming chips throughout feed hopper 7, a hopper chip leveler 9 is added with a linear actuator 10. Hopper chip leveller 9 moves back and forth horizontally, controlled through actuator 10 by a timer (not shown). At the base of feed hopper 7 are motorized rotary scraper blades 11 running the full length of feed hopper 7. These are not visible in the perspective view of FIG. 1, but are shown in side view FIG. 3. Also, feed hopper 7 preferably has a sloping entry side of about sixty degrees relative to horizontal, as depicted, which contains the earlierreferenced magnetic separator. This angle, however, can range anywhere from thirty to eighty degrees. The bottom of the hopper has a rounded "v" bottom, as also depicted.

Figure 4:
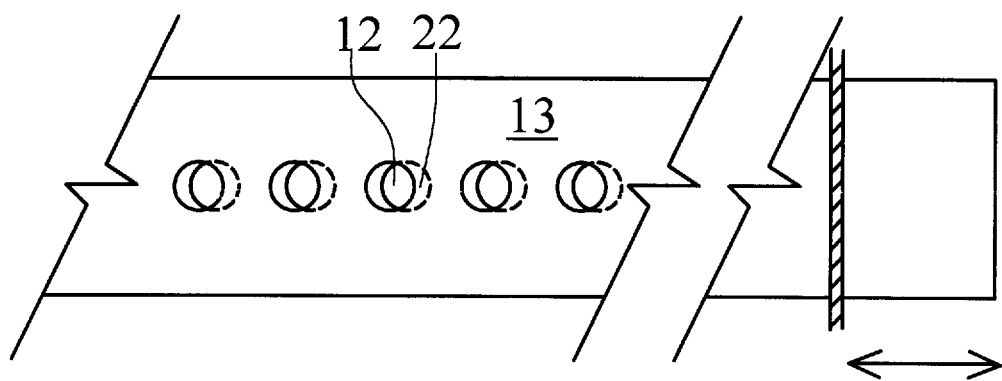
FIG. 4 is a full scale plan view of the spreader openings and slide control.

To deposit the chips from the feed hopper 7 onto moving "endless" conveyor belt 2, Scraper blades 11 rotate as depicted by clockwise arrow 21 (though a counterclockwise direction is also suitable), so as to facilitate chip flow through hopper apertures 12 (see FIG. 4) in the bottom of feed hopper 7. The volume/rate of chip flow through hopper apertures 12 is regulated by flow rate slide 13, which has slide apertures 22 that are substantially the same size as the hopper apertures 12. Both the hopper and slide apertures 12 and 22 are typically ½ inch in diameter, though any diameter ranging from ⅛ inch to ¾ inches is acceptable. Preferred spacing between apertures is about ¾", and generally, about 150% of the aperture diameter, though variations between 100% and 300% of diameter are acceptable. Slide 13 moves by a linear actuator (not shown) to fully or partially align apertures 12 and 22, thereby providing full or partial flow along a continuous range of available flow rates, as desired.

This spreader assembly described this far deposits discreet streams of chips on moving conveyor belt 2, which is preferably made of stainless steel or other suitable material as further described below. The speed of the belt is variable along a continuous ranges of speed anywhere from 1 foot per minute to 10 , feet per minute. In the preferred embodiment the belt is five feet wide and travels four feet per minute, while the chip stream is four feet wide (as a result of the four foot wide feed hopper 7). The belt can, however, can be of any width greater than about two feet, with upper limit imposed only by the size of the vault containing the belt.

To convert the chip stream to an even, uniform chip bed 23 for uniform irradiation, levelling means such as chip bed leveling bar 14 is positioned at an adjustable angle 15 relative to the width of the chip bed. In a preferred embodiment, this angle 15 is between 30 and 45 degrees, though it may vary anywhere from 20 to 60 degrees, and can even be as small as zero degrees. The chosen angle is locked by a set screw (not shown), or may be locked by any other suitable angle locking means for fixing chip bed levelling bar 14 at a set, predetermined angle. The depth of chip bed 23 is monitored by a chip bed level sensor 20, such as a photo cell/light source or similar suitable sensing device known in the art. In response to chip bed level sensor 20, the height of chip bed leveling bar 14 above belt 2 is controlled by levelling bar height adjustment means 16, such as, but not limited to, a motorized screw. In preferred operational mode, bar 14 will be set at approximately ⅜ inch above belt 2 so as to form an approximately ⅜ inch deep chip bed 23. But this can be varied anywhere from ⅛ inch to 1 inch depending upon the quality and size of the chips, and upon the amount of radiation required. Excess chips fall off the side of conveyor belt 2 and are collected in overflow collector hopper 17 and returned to feed hopper 7, in a preferred embodiment, by vacuum return means 18. In an alternative embodiment, the conveyor belt 2 is subjected to vibrations, which operate as the levelling means causing the chips to distribute into the desired substantially uniform chip bed.

After about four feet of belt travel which, in the preferred embodiment, takes about one minute, flow rate slide 13 closes all of hopper apertures 12 to stop flow of additional chips from hopper feed 7 onto belt 2. The closing cycle is controlled by a programmable timer, not shown. The bed of chips then passes beneath electron beam accelerator (EBA) scan horn 1, or other suitable radiation means, for a preferred distance of four feet. The exact distance is controlled by a programmable sensor such as a precision timer (not shown).

The direction of belt flow may then be reversed for a second pass under scan horn 1. After the second pass, belt 2 may reverse direction again, for a third pass. While three passes are used in the preferred embodiment, this device may be programmed to employ any desired number of passes suitable to the proper radiation processing of the polymer chip material being processed. While the length of chip bed 23 is approximately four feet in the preferred embodiment, this length can be as small as two feet, and is limited at the upper end only by the overall length of belt 2, which in turn is limited only by the size of the containing vault.

Because the irradiation of the chips generates significant heat, and because proper processing requires the chips to be maintained below a predetermined maximum temperature, coolant jets 3 in coolant chamber 4 (see FIG. 2) constantly spray the underside of belt 2 to maintain a chip temperature below the maximum temperature, throughout the process cycle, providing a means to cool the chips during irradiation. In the preferred embodiment, for the processing of PTFE chips, this maximum temperature is approximately 400 degrees Fahrenheit. Also, in the preferred embodiment, the coolant is water. Coolant, once sprayed, is collected in coolant chamber 4 so as to exit through coolant drain 5, to be recycled through a heat exchanger and PH control unit (not shown) to maintain a PH of approximately 7.

For three-pass operation, flow rate slide 13 reopens for the next cycle of chip irradiation, simultaneously with the start of the third pass for the prior cycle of irradiation. After three passes (for three-pass operation), the processed chips in chip bed 23 are discharged off the end of belt 2 into irradiated chip collector 19, while the next bed of chips is ready for irradiation. By screw feed or similar means (not shown) the processed chips are fed to a blow-through Rotolok rotary valve and then conveyed out of the vault to a receiving silo by means of a blower (not shown). By having Rotoloks at both the entrance and exit from the vault, the process and any emissions are contained in the vault.

The substantial flatness and uniform distribution of chip bed 23, as well as the precise control gained by moving chip bed 23 upon conveyor belt 2 under scan horn 1, results in a substantially uniform irradiation of all the polymer chips. The above, combined with coolant jets 3 spraying the underside of belt 2, also results in substantially uniform chip cooling.

As noted above, conveyor belt 2 is preferably made of stainless steel. This is because stainless steel will not become damaged by repeated irradiation exposure over time, can be fabricated into a form that is flexible enough to form an "endless" conveyor belt such as belt 2, and is highly-conductive of heat which therefore facilitates cooling by the coolant jets 3 located under the belt 2. Any material with similar characteristics may effectively be substituted for stainless steel within the scope of this invention.

The interrelationships among various parameters of this apparatus and method should also be noted. For example, the speed at which chip bed 23 is moved past scanner horn 1, the number of passes, the length and depth of chip bed 23, the strength of the radiation, and the heat-exchange capacity of the coolant, can all be adjusted depending upon the particular type of polymer to be processed, the quality and size of the polymer chips, the degree of radiation needed, and the desired maximum temperature. Thus, for example, a slower conveyance speed will tend to heat the polymer more rapidly, which in turn may increase the cooling requirements. Similarly, for a deeper chip bed, there will be more variation between the chip temperature higher in the bed and lower in the bed, since the lower chips will be in closer contact with the coolant on the underside of the belt. Or, a particular situation may demand more passes with greater conveyance speed so as to avoid too much polymer heating, or may admit fewer passes with slower speed. In short, it is to be understood that processing situations may vary from one another, and that the parameters for speed, number of passes, bed length, bed depth, coolant type, etc., can be varied in an interrelated manner so as to meet the particular processing requirements. Thus, the various ranges for these parameters outlined herein are simply guidelines that can be adjusted as needed within the spirit of this invention.

It should also be noted that while the conveyor belt 2 provides the chip movement and all other components of the invention remain in fixed position, an obvious variation would be to replace the conveyor belt 2 with an immobile platform, and to have all other components of the invention (i.e., hopper 7, scan horn 1, coolant jets 3, etc. move with respect to the fixed platform.) While more cumbersome and less preferred, such a variation is encompassed by this disclosure and its associated claims.

This invention has applicability to polymer irradiation generally, and particularly to PTFE irradiation, so as to facilitate subsequent air fluidized bed grinding of the subject polymer to a fine powder. But it can be used for any solid polymer in need of additional cross linking, including virgin or scrap PTFE.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A method for radiation processing of polymer chips, comprising the steps of:
    distributing said polymer chips upon a top surface of a substantially flat conveyance means, into a substantially uniform chip bed;
    irradiating said chips by passing said chip bed proximate a radiation means, at least once, at a substantially constant rate of relative speed between said chip bed and said radiation means; and
    cooling said chips during said irradiating to maintain a temperature of said chips below a predetermined maximum temperature, by applying cooling means to an undersurface of said conveyance means.

2. The method of claim 1, wherein the relative direction of movement between said chip bed and said radiation means is reversible, and wherein said step of irradiating said chips comprises passing said chip bed proximate said radiation means, at least three times.

3. The method of claim 1, wherein said step of distributing said polymer chips upon said conveyance means further comprises the steps of:
    depositing the chips from a spreader assembly means onto said top surface of said conveyance means; and
    levelling the deposited chips into said substantially uniform chip bed, at a predetermined chip bed depth, using chip bed levelling means.

4. The method of claim 1, wherein said polymer is the polymer polytetrafluorethylene, in solid form, pre-chopped into flowable polymer chips.

5. The method of claim 1, wherein said predetermined maximum temperature is substantially 400 degrees Fahrenheit.

6. The method of claim 3, wherein said step of depositing the chips from said spreader assembly means onto said top surface of said conveyance means further comprises:
    feeding chips into a chip feed hopper;
    detecting when the chips in said chip feed hopper have reached a predetermined level, using hopper level sensing means;
    controlling said feeding of chips into said feed hopper to prevent overflowing said feed hopper in response to said hopper level sensing means;
    substantially levelling chips in said chip feed hopper using hopper chip levelling means;
    controlling a flow rate of chips out of said spreader assembly means and onto said top surface of said conveyance means, using a plurality of hopper apertures substantially upon a bottom of said chip feed hopper and a flow rate slide slidably disposed thereto comprising a plurality of slide apertures therethrough of substantially the same size as said hopper apertures, so as to enable varying degrees of overlap between said hopper apertures and said slide apertures;
    facilitating the flow of chips through the apertures using rotary scraper means proximate a lower portion of said chip feed hopper.

7. The method of claim 3, wherein said step of levelling the deposited chips into said substantially uniform chip bed further comprises:
    positioning a levelling bar at a angle adjustable as desired through a plane substantially parallel to said top surface of said conveyance means, at a given distance from said top surface;
    sensing a depth of said chip bed using chip bed level sensing means; and
    adjusting said given distance between said levelling bar and said top surface in response to said chip bed level sensing means, thereby maintaining the chip bed depth at a desired, predetermined depth.

8. The method of claim 1, further comprising:
    collecting overflow polymer chips falling off of said conveyance means using overflow collection means; and
    returning said overflow polymer chips using chip return means, to said chip distribution means for redistributing said overflow polymer chips upon said top surface of said conveyance means.

9. The method of claim 1, further comprising automatically collecting chips that have been irradiated by said apparatus, using automated chip collection means.

10. The method of claim 1, wherein said conveyance means is fabricated from a material which can be subjected to repeated radiation exposure over time without substantial degradation; which is sufficiently flexible to be fashioned into an endless conveyor belt; and which is sufficiently heat-conductive to facilitate so-cooling said chips by so-cooling said undersurface of said conveyance means.

11. The method of claim 1, wherein said conveyance means is an endless conveyor belt.

12. An apparatus for radiation processing of polymer chips, comprising:
    substantially flat conveyance means;
    chip distribution means for distributing said polymer chips upon a top surface of said conveyance means, into a substantially uniform chip bed;
    radiation means for irradiating said chips by passing said chip bed proximate said radiation means, at least once, at a substantially constant rate of relative speed between said chip bed and said radiation means; and cooling means cooling said chips during said irradiating to maintain a temperature of said chips below a predetermined maximum temperature, by cooling an undersurface of said conveyance means.

13. The apparatus of claim 12, wherein the relative direction of movement between said chip bed and said radiation means is reversible, and wherein said chip bed is passed proximate said radiation means, at least three times.

14. The apparatus of claim 12, wherein said distribution means further comprises:

spreader assembly means depositing the chips onto said top surface of said conveyance means; and chip bed levelling means levelling the deposited chips into said substantially uniform chip bed, at a predetermined chip bed depth.

15. The apparatus of claim 12, wherein said polymer is the polymer polytetrafluorethylene, in solid form, pre-chopped into flowable polymer chips.

16. The apparatus of claim 12, wherein said predetermined maximum temperature is substantially 400 degrees Fahrenheit.

17. The apparatus of claim 14, wherein said spreader assembly means further comprises:

a chip feed hopper;

auger means feeding chips into said chip feed hopper;

hopper level sensing means for detecting when the chips in said chip feed hopper have reached a predetermined level, controlling said auger to prevent overflowing said chip feed hopper;

hopper chip levelling means substantially levelling chips in said chip feed hopper;

a plurality of hopper apertures substantially upon a bottom of said chip feed hopper;

a flow rate slide comprising therethrough a plurality of slide apertures of substantially the same size as said hopper apertures and slidably disposed with respect to said hopper apertures so as to enable varying degrees of overlap between said hopper apertures and said slide apertures, thereby controlling a flow rate of chips through the apertures, out of said spreader assembly means, and onto said top surface of said conveyance means; and rotary scraper means proximate a lower portion of said chip feed hopper to facilitate the flow of chips through the apertures.

18. The apparatus of claim 14, wherein said chip bed levelling means further comprises:

a levelling bar positioned at a angle adjustable as desired through a plane substantially parallel to said top surface of said conveyance means, at a given distance from said top surface; and chip bed level sensing means for sensing a depth of said chip bed and adjusting said given distance between said levelling bar and said top surface in response thereto, thereby maintaining the chip bed depth at a desired, predetermined depth.

19. The apparatus of claim 12, further comprising:

overflow collection means collecting overflow polymer chips falling off of said conveyance means; and chip return means returning said overflow polymer chips to said chip distribution means for redistribution upon said top surface of said conveyance means.

20. The apparatus of claim 12, further comprising automated chip collection means for automatically collecting chips that have been irradiated by said apparatus.

21. The apparatus of claim 12, wherein said conveyance means is fabricated from a material which can be subjected to repeated radiation exposure over time without substantial degradation; which is sufficiently flexible to be fashioned into an endless conveyor belt; and which is sufficiently heat-conductive to facilitate so-cooling said chips by so-cooling said undersurface of said conveyance means.

22. The apparatus of claim 12, wherein said conveyance means is an endless conveyor belt.

* * * * *